(12) United States Patent
Wastlhuber et al.

(10) Patent No.: US 7,289,438 B2
(45) Date of Patent: Oct. 30, 2007

(54) METHOD AND DEVICE FOR SERIAL DATA TRANSMISSION BETWEEN A POSITION MEASURING SYSTEM AND A PROCESSING UNIT

(75) Inventors: Robert Wastlhuber, Garching/Alz (DE); Erich Strasser, Trostberg (DE); Christian Eisenberger, Ruhpolding (DE); Erwin Bratzdrum, Hallabruck (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 828 days.

(21) Appl. No.: 09/884,553

(22) Filed: Jun. 18, 2001

(65) Prior Publication Data

US 2002/0015389 A1 Feb. 7, 2002

(30) Foreign Application Priority Data

Jun. 21, 2000 (DE) ............................... 100 30 358

(51) Int. Cl.
*G06F 11/00* (2006.01)
*G06F 15/16* (2006.01)
*H04B 1/44* (2006.01)

(52) U.S. Cl. ................... 370/229; 370/282; 370/455; 709/232; 714/819

(58) Field of Classification Search ........ 370/229–236, 370/282, 252–253, 443–444, 455, 471, 475; 709/229–231, 225–227, 216, 232, 235, 237, 709/240, 245; 714/701, 799, 819
See application file for complete search history.

(56) References Cited

U.S. PATENT DOCUMENTS 5,371,859 A * 12/1994 Lennartsson ............... 710/114

| | | | |
|---|---|---|---|
| 5,600,803 A | 2/1997 | Iitsuka et al. | |
| 5,625,353 A | 4/1997 | Katagiri et al. | |
| 5,687,103 A * | 11/1997 | Hagl et al. ................. | 702/150 |
| 5,815,089 A | 9/1998 | Katagiri et al. | |
| 5,909,371 A * | 6/1999 | Rehm et al. ................. | 700/56 |
| 6,124,588 A | 9/2000 | Hagl et al. | |
| 6,326,778 B1 | 12/2001 | Hummel | |
| 6,480,138 B1 | 11/2002 | Zinke et al. | |
| 6,542,947 B1 | 4/2003 | Bühring | |

FOREIGN PATENT DOCUMENTS

DE 30 01 331 7/1981

(Continued)

OTHER PUBLICATIONS

Schneider, Sandro, "Verteilte Intelligenz im CAN-Bus-Verbund," F&M, vol. 104, No. 10, 1996, pp. 757-758.

(Continued)

*Primary Examiner*—Afsar Qureshi
(74) *Attorney, Agent, or Firm*—Brinks Hofer Gilson & Lione (57) ABSTRACT

A method for serial data transmission between a position measuring system and a processing unit that includes transmitting position data and further data between the position measuring system and the processing unit in serial form as digital data words, transmitting up-to-date position data between the position measuring system and the processing unit upon a position request command and always transmitting further data, whose processing is not time-critical, immediately following the up-to-date position data.

37 Claims, 5 Drawing Sheets

FOREIGN PATENT DOCUMENTS

| | | |
|---|---|---|
| DE | 30 01 331 C2 | 7/1981 |
| DE | 40 05 087 | 8/1991 |
| DE | 4005087 * | 8/1991 |
| DE | 40 05 087 C1 | 9/1991 |
| DE | 43 44 916 | 6/1994 |
| DE | 43 44 916 A1 | 6/1994 |
| DE | 691 25 475 T2 | 2/1998 |
| DE | 197 14 152 | 8/1998 |
| DE | 197 14 152 A1 | 8/1998 |
| DE | 198 11 095 | 9/1999 |
| DE | 198 11 095 A1 | 9/1999 |
| DE | 694 32 726 T2 | 5/2003 |
| EP | 0 631 239 A2 | 12/1994 |
| EP | 0 660 209 | 6/1995 |
| EP | 0 660 209 A1 | 6/1995 |
| EP | 0 660 209 B1 | 10/1996 |
| EP | 0 989 701 A2 | 3/2000 |
| WO | WO 96/33450 | 10/1996 |
| WO | WO 00/03521 | 1/2000 |
| WO | WO 00/24165 | 4/2000 |

OTHER PUBLICATIONS

Bielski, Steffen et al., "Absolute Messsysteme—Sicherheitserwartungen an die Datenerfassung und Datenubertragung," Automatisieren, Nos. ½, 1996, pp. 6, 8, 9, 12, 14.

Pending Claims of Patent Application Assigned to Dr. Johannes Heidenhain GmbH: U.S. Appl. No. 09/884,858, Filing Date: Jun. 18, 2001, Inventor: Wastlhuber et al.

Kennel, Ralph et al., "Datenkommunication uber das Bussystem,,SERCOS interface"—Auswirkungen auf Antriebsregelungen in Werkzeugmaschinen, Automatisierungstechnische Praxis—ATP, Oldenbourg Verlag, Munchen, Germany, vol. 33, No. 7, Jul. 1, 1991, pp. 363-368.

S.M. Sharrock et al., "A Framed, Movable-Boundary Protocol for Integrated Voice/Data in a LAN" Proceedings of the ACM SIGCOMM Conference on Communications Architecture & Protocols held in Stow, Vermont, 1986, pp. 111-119.

Biaesch-Wiebke, Claus, "CD-Player und R-DAT-Recorder", published by VOGEL Buchverlag, Würzburg, Germany, 1988, pp. 89-90.

Kennel, Ralph et al., "Datenkommunication uber das Bussystem, SERCOS interface-Auswirkungen auf Antriebsregetungen in Werkzeugmaschinen," Automatisierungstechnische Praxis-ATP, Oldenbourg Verlag, Munchen, Germany, vol. 33, No. 7, Jul. 1, 1991, pp. 363-368.

Baginski, Alfredo, et al., "InterBus-S-Grundlagen und Praxis", published by Hüthig Buch Verlag, Heidelburg, Germany, 1994, two page forward and pp. 13; 28; 29; 39; 42; 49; 68-71; 73-75; 82 and 85.

Author unknown, "InterBus-S, Sensor-/Aktornetzwerk für industrielle Steuerungssysteme" published by DIN Deutsches Institut für Normung e.V., May, 1994, pp. 1 and 4.

Author unknown, CANOpen-CAL Based Communication Profile for Industrial Systems-Revision 3.0, published by CAN in Automation, Oct., 1996, pp. 1-1; 2-1; 3-1; 4-1-4; 5-1-7; 6-1-2; 7-1-5; 8-1-14; 9-1-2; 10-1-38; 11-1-5; 12-1-15 and Seite 1-7.

Baginski, Alfredo, et al., "InterBus-Grundlagen und Praxis", published by Héthig Buch Verlag, Heidelburg, Germany, 1998, pp. 11-14; 16; 17; 19-22; 36, 37; 47-51; 68-71; 82; 117 and 162.

Reißenweber, Bernd, "Feldbussysteme", published by R. Oldenbourg Verlag, München, Germany, 1998, pp. 220 and 227.

Domanowski, F., et al., "AS-Interface-The Actuator-Sensor-Interface for Automation", second revised edition, published by Carl Hanser Verlag, München, Germany, 1999, p. 30.

* cited by examiner

METHOD AND DEVICE FOR SERIAL DATA TRANSMISSION BETWEEN A POSITION MEASURING SYSTEM AND A PROCESSING UNIT

Applicants claim, under 35 U.S.C. §119, the benefit of priority of the filing date of Jun. 21, 2000 of a German patent application, copy attached, Serial Number 100 30 358.7, filed on the aforementioned date, the entire contents of which is incorporated herein by reference.

BACKGROUND OF THE INVENTION

1. Field of the Invention

The present invention relates to a method for serial data transmission between a position measuring system and a processing unit, wherein position data and further data are transmitted from the position measuring system to the processing unit in serial form as digital data words. The present invention also relates to a device for executing the method.

2. Discussion of Related Art

A method, or a device, regarding serial data transmission is known from EP 0 660 209 B1. The bidirectional serial transmission on a data line of position data and further data, or additional data, between a position measuring system and a subordinate processing unit is proposed in this reference. Specific parameters of the respective position measuring system, such as data regarding the type of measuring system, the signal period, the reference marker positions, and many more, are for example exchanged as further data. The position data, as well as the further data, are transmitted in the form of digital data words via the data line. The transmission of position data or further data to the processing unit takes place upon receipt of a respective request command from the processing unit. This has the result in the case of the requested transmission of voluminous additional data, that during the transmission of these data there are no position data available to the processing unit. Problems can result in connection with a possibly required highly dynamic control on the basis of position data from the position measuring system because of the rigid transmission pattern and the limited transmission speed resulting therefrom.

OBJECTS AND SUMMARY OF THE INVENTION

It is therefore an object of the present invention to disclose a method, as well as a device, for the serial data transmission between a position measuring system and a processing unit, which makes possible a dependable highly dynamic control on the basis of position data from the position measuring system. Furthermore, a continuous exchange of data between the processing unit and the position measuring system should also be possible.

This object is attained by a method for serial data transmission between a position measuring system and a processing unit that includes transmitting position data and further data between the position measuring system and the processing unit in serial form as digital data words, transmitting up-to-date position data between the position measuring system and the processing unit upon a position request command and always transmitting further data, whose processing is not time-critical, immediately following the up-to-date position data.

Furthermore, the above object is attained by a device for serial data transmission that includes a processing unit and a position measuring system, wherein position data and further data are transmitted between the position measuring system and the processing unit in serial form as digital data words. The position measuring system includes a control unit which, upon receipt of a position request, causes a transmission of up-to-date position data between the position measuring system and the processing unit and, following the up-to-date position data, causes transmission of further data, whose processing is not time-critical.

The steps in accordance with the present invention now assure that actual position data from the position measuring system are available to the processing unit even in case of rapid control cycles. Moreover, besides the transmission of position data, the exchange of further data between the processing unit and the position measuring system is possible. It is possible to assure this even in the case of a highly dynamic control, since the data exchange does not exclusively include the transmission of position data. Therefore, the data to be transmitted are divided by the present invention into time-critical and non-time-critical data. Here, the position data, as well as associated position request commands, in particular, represent time-critical data, which are required in particular for a rapid position control. The further data in the form of additional data and additional data commands, however, represent non-time-critical information, whose processing is possible during clearly greater cycle times. Furthermore, in place of a rigid request-response pattern it is now assured, that only the position request commands and the position data are available in rapid reaction times to the position measuring system, or the processing unit. It is no longer imperative that the requested additional data be transmitted immediately following an additional data command. In this case it must merely be assured that the data later transmitted in response to this request can be unequivocally identified, or associated, by the processing unit. In accordance with the present invention it is also possible to transmit the additional data, which are a part of a request, in several additional data blocks, which are not chronologically connected.

It should be cited as a further advantage of the present invention, that in principle it is possible at any time to transmit the actual position data from the position measuring system to the evaluation unit upon an appropriate position data request command. This is possible, for example, also in case of the actual transmission of non-time-critical data, which are transmitted at that time as a current data flow. This data flow can be interrupted at any time during the requested transmission of actual position data. Following the requested transmission of the time-critical position data, the transmission of the non-time-critical continues to flow, etc.

It is possible to embody the present invention in a first variation in such a way that the transmission of all data takes place over a single common data channel, i.e. to provide a semi-duplex operation. However, alternatively it is also possible to provide a separate data channel for each direction of transmission, i.e. to provide two separate transmission channels for full duplex operation.

It is moreover advantageous that it is possible for different position data request commands to be present, to which different processing priorities are assigned. For example, it is possible to request the transmission of up-to-date position data to the processing unit at the highest priority, which are used there for a highly dynamic position control. A second priority data request command can be provided at a lower processing priority, which requests the transmission of up-to-date position data to the processing unit, which are employed there for digitizing a workpiece shape. Such a position data request command can be triggered, for example, by a scanning pulse of a scanning system, by which the workpiece is scanned. It is also possible in principle to interrupt the transmission of position data of lower processing priority by position data request commands of higher processing priority.

As a whole, the steps in accordance with the present invention assure a transmission of position data at a high speed, or with the highest priority, to the processing unit. But at the same time the transmission of further, non-time-critical data is possible within the scope of the serial data transmission. It should furthermore be mentioned that this is possible with a lesser outlay with respect to the required wiring.

Moreover, the present invention is independent of the physical structure of an appropriate interface, and can be employed on the basis of the most different interface structures.

Further advantages, as well as details of the present invention ensue from the following description of the attached drawings.

DETAILED DESCRIPTION OF THE PREFERRED EMBODIMENTS

Figure 1:
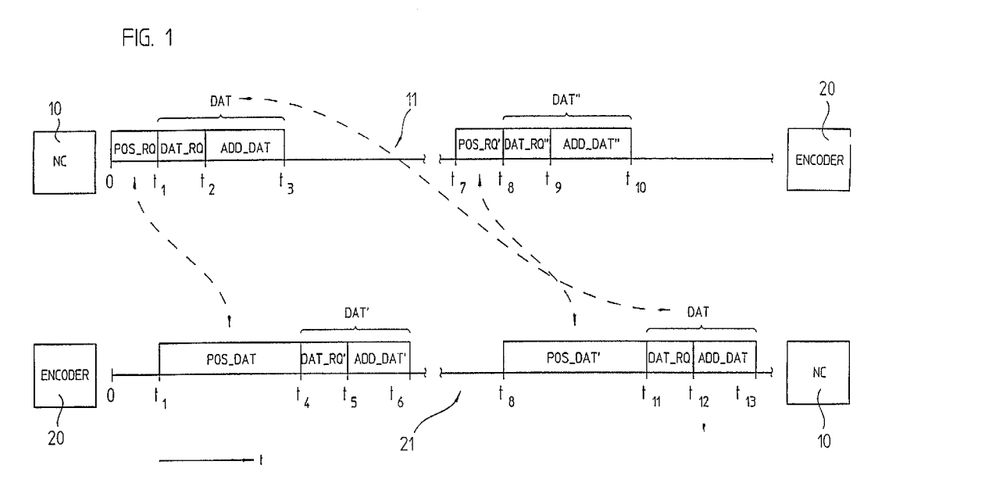
FIG. 1 is a schematic representation of a portion of an embodiment of a transmission protocol to explain a first variation of an embodiment of a method in accordance with the present invention.
Figure 2A:
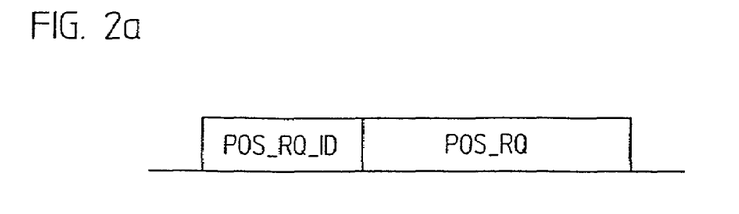
FIGS. 2a to 2d each show in a schematic form an embodiment of the basic structure of different time-critical and non-time-critical data words according to the present invention.
Figure 2B:
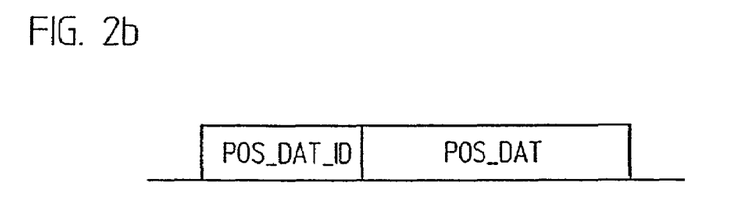
Figure 2C:
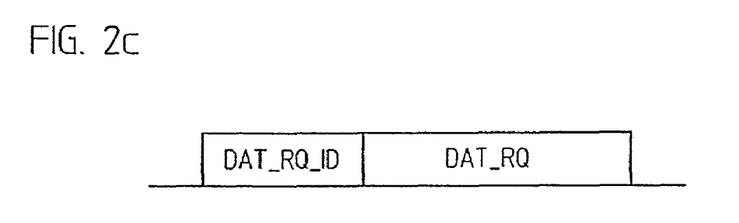
Figure 2D:
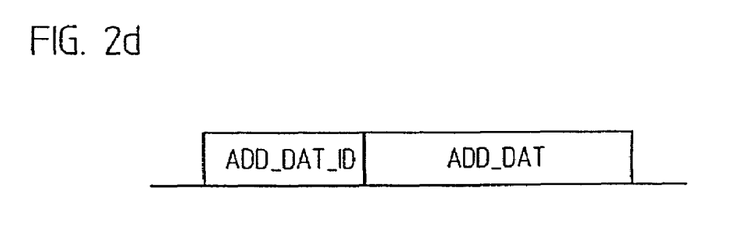

A first embodiment of the method of the present invention, or of the device in accordance with the present invention, will be explained in what follows by FIG. 1. FIG. 1 represents in a schematic form a chronological section of the serial data transmission between a position measuring system (ENCODER) 20 and a processing unit (NC) 10. The data transmitted from the processing unit 10 to the position measuring system are represented in the upper part of FIG. 1. The data transmitted during the same time interval from the position measuring system 20 to the processing unit 10 are represented in the lower part of FIG. 1. A known absolute or incremental measuring system, for example, can be provided as the position measuring system 20, which is used in a machine tool for the highly precise determination of the position of a machine component. In this case, a customary numerical machine tool control is then used as the processing unit 10, which controls, or checks, the processing of a work piece on the basis of the received data.

A full duplex variation of the present invention will be explained in what follows by the first exemplary embodiment represented in FIG. 1. This means that two separate data channels 11, 21 are provided for data transmission. A first data channel 21 is used for the serial transmission of data from the position measuring system 20 to the processing unit 10, a second data channel 11 is provided for the serial transmission of data from the processing unit 10 to the position measuring system 20. The respective data are transmitted through the two data channels 11, 21 in a known manner as digital data words of a predetermined size. In a possible embodiment the transmission of data words of a 10 bit word length takes place.

It should be pointed out here in connection with the two data channels 11, 21, that it is not essential within the scope of the present invention how these are actually physically designed. Instead, it is possible to provide the present invention on the basis of physically different serial interface concepts.

Two separate data channels are provided in a possible embodiment, each of which is designed as a twisted two-wire line, through which the respective data are transmitted in the form of clock pulses or counter-clock pulses. The voltage and current supply for the position measuring system is simultaneously performed through these lines.

Alternatively to this it would also be possible to supply the position measuring system over separate lines. A data transmission via optical waveguides, etc., would also be possible.

In the chronological section of the data exchange between the processing unit 10 and the position measuring system 20 represented, the processing unit 10 transmits a first position request command POS_RQ to the position measuring system 20 at the time t=0 over the second data channel 11. Such a position request command POS_RQ can be possibly triggered by a position request signal from the position control. The subsequent transmission of the position request command POS_RQ by the processing unit 10 is immediately followed by the transmission of further data DAT over the second data channel 11, starting at the time $t=t_1$ and ending at the time $t=t_3$.

Within the scope of the present invention it is now important that processing of the further data DAT transmitted following the position request command POS_RQ on the respectively opposite side is not time-critical. This means that the processing of these further data DAT and/or an appropriate response to them must not take place immediately after their transmission, but after a defined chronological offset $\Delta t$. But the processing, or handling, of the first transmitted position request command POS_RQ takes place at the highest time priority. Accordingly, the position measuring system 20 starts almost immediately, or as rapidly as possible, after the receipt of the position request command POS_RQ at the time $t=t_1$ with the transmission of the position data POS_DAT on the first data channel 21. For example, the up-to-date absolute position is here transmitted as a digital data word to the processing unit 10. The transmission of the position data POS_DAT is completed at the time $t=t_4$, thereafter the transmission of further data DAT', whose processing on the opposite side is also not time-critical, takes place on the first data channel 21 analogously to the second data channel 11.

Within the scope of the transmission pattern of the present invention, a division of the data transmitted between the position measuring system 20 and the processing unit 10 into time-critical data commands on the one hand and, on the other, non-time-critical data and commands, takes place in this way. The transmission of time-critical data, or the processing of commands in connection with time-critical data always takes precedence over the transmission, or the processing, of non-time-critical data and commands.

Those data and commands which have a direct connection with the up-to-date detected position of the position measuring system 20 and which must be rapidly available to the processing unit 10 for a highly dynamic control, are to be considered time-critical. In detail, this means in the present example the position request commands POS_RQ transmitted by the processing unit 10, as well as the position data POS_DAT, transmitted in response thereto by the position measuring system 20. Absolute position data, as well as incremental position data can be transmitted as position data POS_DAT.

But those exchanged data and commands which do not have a direct connection with the up-to-date position data, such as data and/or parameters of the position measuring system, reference information, measured temperature values, diagnostic data, and many more, are to not be considered time-critical. This type of transmitted non-time-critical data DAT, DAT' will be covered in detail in what follows. It should be mentioned in connection with the further non-time-critical data DAT, DAT' that, perhaps in connection with a possible command regarding these data, it is basically not required that the respective command be immediately processed, instead, it is also possible that the processing of the command can take place later.

In the present example, the exchanged non-time-critical data DAT and DAT' include in detail, up to the time $t=t_6$, the additional data ADD_DAT, ADD_DAT', as well as the additional data commands DAT_RQ, DAT_RQ'.

Based on such a division of the exchanged data it is also possible that a current transmission of non-time-critical data DAT, DAT' from the position measuring system 20 to the processing unit 10 in the form of a continuous data flow is interrupted by a position request command POS_RQ from the processing unit 10, and a transmission of up-to-date position data POS_DAT to the processing unit 10 takes place immediately or almost immediately as a response to this position request command POS_RQ. The transmission of non-time-critical data DAT, DAT' interrupted in this way will be completed at a later time. The appropriate steps will be explained in detail in the course of the description of FIGS. 3a to 3c.

In the same way it is possible without such an interruption of non-time-critical data DAT, DAT' to transmit associated data DAT, DAT' in a manner wherein they are chronologically distributed over several blocks which follow each other at defined intervals, and between which up-to-date position data POS_DAT can then be transmitted. Such a distribution over several blocks can be necessary, or useful, perhaps in the case of particularly voluminous non-time-critical data DAT to be transmitted.

In the example of FIG. 1 represented, an additional data command DAT_RQ, DAT_RQ', or additional data ADD_DAT, ADD_DAT' are respectively transmitted as non-time-critical data DAT, DAT', which follow the respective time-critical data in the form of position request commands POS_RQ and POS_DAT. Thus, in the present example the further non-time-critical data DAT, DAT' should be divided into additional data ADD_DAT, ADD_DAT' and additional data commands DAT_RQ, DAT_RQ'. The additional commands DAT_RQ, DAT-RQ' can be, for example, the request for defined additional data ADD_DAT, ADD_DAT' from the respective other side. For example, the processing unit 10 can request certain measuring system parameters as additional data ADD_DAT from the position measuring system 20 by an appropriate additional data command DAT_RQ, etc.

Besides the mentioned request commands, further commands can also be provided as additional data commands DAT_RQ, DAT_RQ', for example commands in connection with programming or calibrating a position measuring system, etc.

In the example of FIG. 1, the processing unit 10 transmits, starting at the time $t=t_1$, i.e. following the transmission of the position request command POS_RQ, an additional data command DAT_RQ to the position measuring system 20, by which additional data, for example the temperature T of the position measuring system 20, are requested. As soon as the transmission of the additional data command DAT_RQ is ended at the time $t=t_2$, the transmission of additional data ADD_DAT from the processing system 10 to the position measuring system 20 takes place until the time $t=t_3$. These can be, for example, programming parameters for the position measuring system 20.

Following receipt of the position request command POS_RQ at the time $t=t_1$, the position measuring system 20 responds on the other data channel 21 with the direct transmission of the up-to-date position data POS_DAT, which are available in the position measuring system 20. The dashed connection line in FIG. 1 indicates that the transmission of the position data POS_DAT is the direct response to the previous position data request POS_RQ.

As soon as the up-to-date position data POS_DAT have been completely transmitted at the time $t=t_4$, the transmission of the non-time-critical data DAT' from the position measuring system 20 to the processing unit 10 starts. Initially an additional data request DAT_RQ' is transmitted in the time between $t=t_4$ and $t=t_5$ to the processing unit 10, the transmission of additional data ADD_DAT' takes place in the subsequent time interval between $t=t_5$ and $t=t_6$. It is important here that the additional data ADD_DAT' transmitted do not need to be those additional data, which had been requested immediately prior to this by the processing unit 10 by the additional data command DAT_RQ on the other data channel 11, instead, these can be additional data ADD_DAT', which had already been requested long before this by the processing unit 10. Analogously to this, the response by the position measuring system 20 to the request for additional data during the time interval $t=t_1$ to $t=t_2$ can take place at a definitely later time t. To explain this principle, a second part of the time axis is represented in the example shown, which represents a time interval following later after the first data exchange interval between $t_1$ and $t_6$. In the later time interval between $t=t_7$ and $t=t_{13}$, the transmission, among others, of the additional data ADD_DAT requested at the time $t=t_1$ takes place. Here, too, the dashed line between the additional data DAT indicates that these are parts of each other. Otherwise, the data exchange in this time interval takes place principally as already mentioned above.

The basic structure of the various transmitted digital data words, which are transmitted as time-critical data, or non-time-critical data in the present example, will be explained by FIGS. 2a to 2d.

Since as a rule a continuous data flow in the form of appropriate digital data words is exchanged between the processing unit and the position measuring system on the two data channels, it is basically necessary to clearly identify the various types of the respective data words. Only then is it possible to assure the correct processing of the various data words by the processing unit and the position measuring system. For this reason it has been provided to transmit identifying information in the form of a specific data word identification before every transmitted data word, or data packet. The start of the following data, as well as the type of the following data, is clearly identifiable by the respective other side by the data word identification. In this case, the following data can be individual digital data words or data packets, which include individual digital data words.

FIGS. 2a to 2d respectively schematically represent how a data word identification, POS_RQ_ID, POS_DAT_ID, DAT_RQ_ID, ADD_DAT_ID is transmitted before the individual time-critical data POS_RQ, POS_DAT, and the non-time-critical data DAT_RQ, ADD_DAT. Incidentally, in FIG. 1 a representation of these data word identifications POS_RQ_ID, POS_DAT_ID, DAT_RQ_ID, ADD_DAT_ID transmitted before the respective data was omitted for reasons of clarity. It is possible by the respective data word identifications to assure the correct processing, or handling, of the transmitted data on both sides.

Since, as explained above, the transmission of requested non-time-critical additional data ADD_DAT can easily take place at an increased chronological distance from the respective request by the additional data command DAT_RQ, it is furthermore necessary that the transmitted additional data ADD_DAT can be recognized as the response to a defined previous request for additional data. For this reason appropriate assignment information is transmitted at the beginning of each transmitted data word ADD_DAT, or possibly data packet, together with the actual additional data. This can possibly take place in the form of a simple response number, if a corresponding question number has been assigned to the associated question. There are of course also other possibilities of transmitting the assignment information, or to assure a clear association of the transmitted additional data to the preceding additional information requests.

Figure 3A:
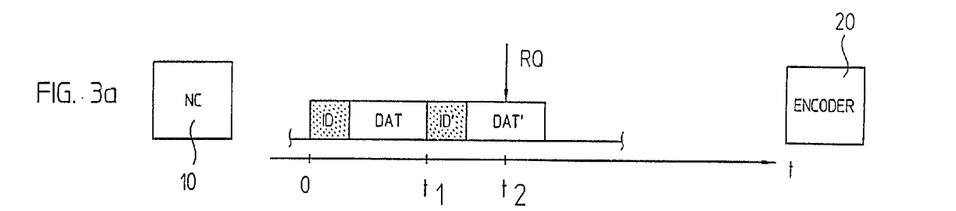
FIGS. 3a to 3c show two examples of chronological sequences of data transmission from the evaluation unit to the position measuring system for the case of a request for position data during the actual transmission of non-time-critical data according to the present invention.
Figure 3B:
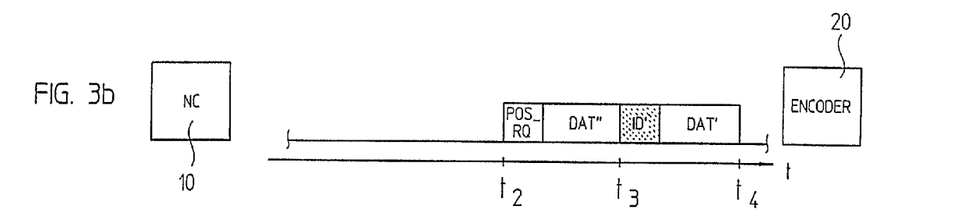
Figure 3C:
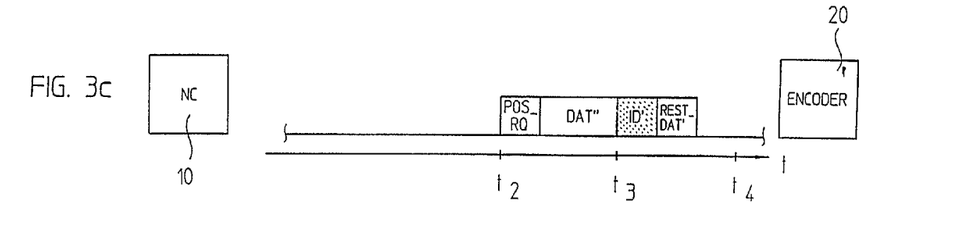

As already indicated above, it now intended to show by FIGS. 3a to 3c how it is possible within the scope of the present invention for an interruption of a continuous data flow, in which non-time critical, or even more non-time-critical data are transmitted, to take place basically at any time.

The actually running transmission of non-time-critical data DAT, DAT' from the processing unit (NT) 10 to the position measuring system (ENCODER) 20 is shown in FIG. 3a. As already explained above, an associated data word identification DAT_ID, DAT'_ID has been placed in front of the respective non-time-critical data DAT, DAT' in order to clearly identify the type of the corresponding non-time-critical data DAT, DAT' at the position measuring system 20.

While the complete transmission of the first block of non-time-critical data DAT, including the data word identification DAT_ID, still takes place within the time interval between $t=t_0$ and $t=t_1$, the transmission of the following block of non-time-critical data DAT' is interrupted at the time $t=t_2$. This takes place by the schematically indicated position request signal RQ, by which a position control circuit in the processing unit 10, for example, requests up-to-date position data from the position measuring system 20. According to FIG. 3b, immediately following the arrival of the position request signal RQ, the current transmission of the non-time-critical data DAT' is interrupted and in place of it a position request command POS_RQ, including the associated data word identification, not represented, is transmitted to the position measuring system 20. The position measuring system 20 also responds immediately with the transmission, not represented, of the up-to-date detected position data, as has already been explained by FIG. 1. In accordance with the transmission pattern in accordance with the present invention, following the transmission of the position request command POS_RQ, further non-time-critical data DAT" are transmitted to the position measuring system 20 in the time interval between $t=t_3$ and $t=t_4$. Moreover, it is now also necessary to complete the transmission of the non-time-critical data word DAT', which had been interrupted at the time $t=t_2$. In accordance with the variation in FIG. 3b this takes place in that the respective data DAT', including the data word identification DAT'_ID' are again completely transmitted to the position measuring system 20 in the time interval between $t=t_3$ and $t=t_4$.

However, it would be possible alternatively to this procedure and as illustrated in FIG. 3c, to transmit in the time interval between $t=t_3$ and $t=t_4$ only the remaining portion REST_DAT' of the non-time-critical data DAT', whose complete transmission was interrupted at the time $t=t_2$.

As explained by this example, it is therefore possible to interrupt a continuous data flow of non-time-critical data DAT, DAT' between the processing unit 10 and the position measuring system 20 at any time in order to request time-critical data required, for example, for a highly dynamic position control.

It is furthermore possible within the scope of the present invention to request from the position measuring system 20 position data POS_DAT to be processed with defined processing priorities in the processing unit 10. For example, it is possible that position data, on the one hand for position control and, on the other for digitizing a workpiece, are required in a processing unit 10 designed as a machine tool control. The latter is usually performed with the aid of a scanning system, which scans the respective workpiece contour and, in case a scanning signal is generated, transmits the up-to-date position data POS_DAT from the scanning system to the processing unit 10. Here, the up-to-date position data are determined by the position measuring system 20. While the position data POS_DAT for the position control must be extremely rapidly available, in particular in the case of a highly dynamic control, the further processing of the position data POS_DAT for digitizing a workpiece contour is less critical. For this reason it is possible to provide in the present invention to make available several position request commands POS_RQ$^n$ (n=1, 2, . . . ), to which different processing priorities have been assigned. For example, a first position request command POS_RQ$^1$ is provided, which causes the transmission of position data POS_DAT to the processing unit 10 at the highest processing priority and which are used there for a position or placement control. Furthermore, there is at least one second position request command POS_RQ$^2$, which causes the transmission of the up-to-date position data POS_DAT to the processing unit 10 at a lower processing priority and which are then used there for digitizing a workpiece contour.

The processing priorities assigned to the various position request commands POS_RQ$^n$ have the result that in this way a further priority differentiation of the position interrogation, or the position data transmission, is possible. For example, the current transmission of position data POS_DAT to the processing unit 10, which are required there for digitizing and had been previously requested by a lower priority position request command POS_RQ$^2$, can be interrupted. The interruption is here performed by the respective position request command POS_RQ$^1$, which has the highest priority and causes the immediate transmission to the processing unit 10 of position data POS_DAT for position control.

It is of course also possible to provide more than two position request commands POS_RQ" with the appropriate processing priorities.

Figure 4:
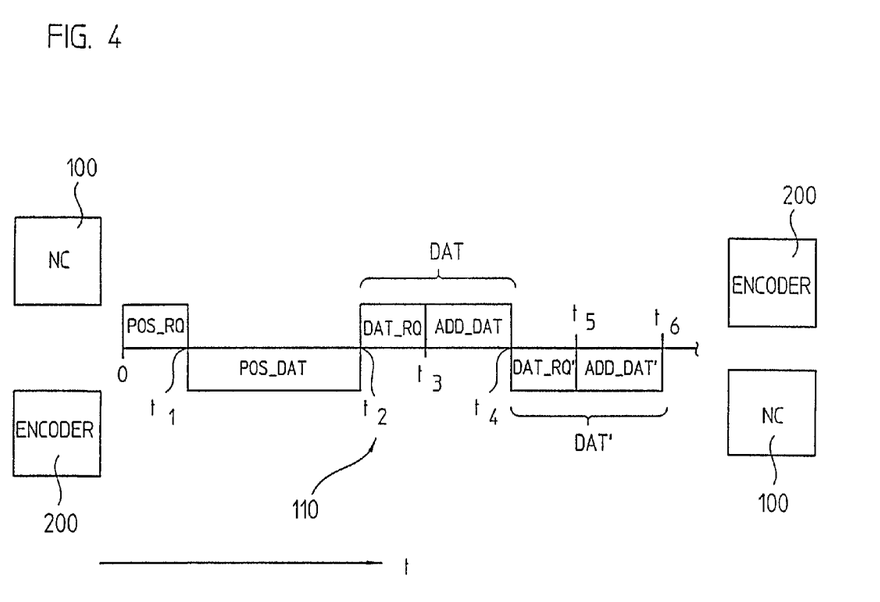
FIG. 4 is a schematic representation of a portion of an embodiment of a transmission protocol to explain a second variation of the method in accordance with the present invention.

While a full duplex variation of the present invention, having two separate data channels 11, 21, has been explained in the example in FIG. 1 so far discussed, in what follows it will be illustrated by FIG. 4 that it is also possible to design an alternative embodiment as a semi-duplex variation.

In contrast to the first example in FIG. 1, only a single data channel 110 is provided between the position measuring system 200 and the processing unit 100. The data from the position measuring system (ENCODER) 200 to the processing unit (NC) 100, as well as the data from the processing unit 100 to the position measuring system 200, are transmitted together on the data channel 110. As a result of the common utilization of a single data channel 110, there is a transmission pattern, which is somewhat, modified with respect to the first example.

Again, the transmission of a position request command POS_RQ from the processing unit 100 to the position measuring system 200 takes place at the time t=0. The latter immediately responds with the transmission of the up-to-date position data POS_DAT between the times $t=t_1$ and $t=t_2$. The transmission of the non-time-critical further data DAT from the processing unit 100 to the position measuring system 200 only takes place in the time interval between $t=t_2$ and $t=t_4$, after the time $t=t_2$, at which the transmission of the position data POS_DAT to the processing unit 100 had been finished. The position measuring system 200 finally responds with the transmission of further, non-time-critical data DAT' in the subsequent time interval between $t=t_4$ and $t=t_6$ to end this data transmission cycle.

Analogously with the above example, the transmitted non-time-critical data DAT includes additional data ADD_DAT, ADD_DAT', and the additional data commands DAT_RQ, DAT_RQ'. Because of the chosen division of the data to be transmitted into time-critical and non-time-critical further data DAT, DAT' it is again assured that rapid control cycles of the processing unit 100 can be supplied with the required position data POS_DAT by a rapid reaction from the position measuring system 200.

With this variation of the present invention it is of course also possible to provide the above explained individual measures, a repeated description of all details is therefore omitted here.

Figure 5:
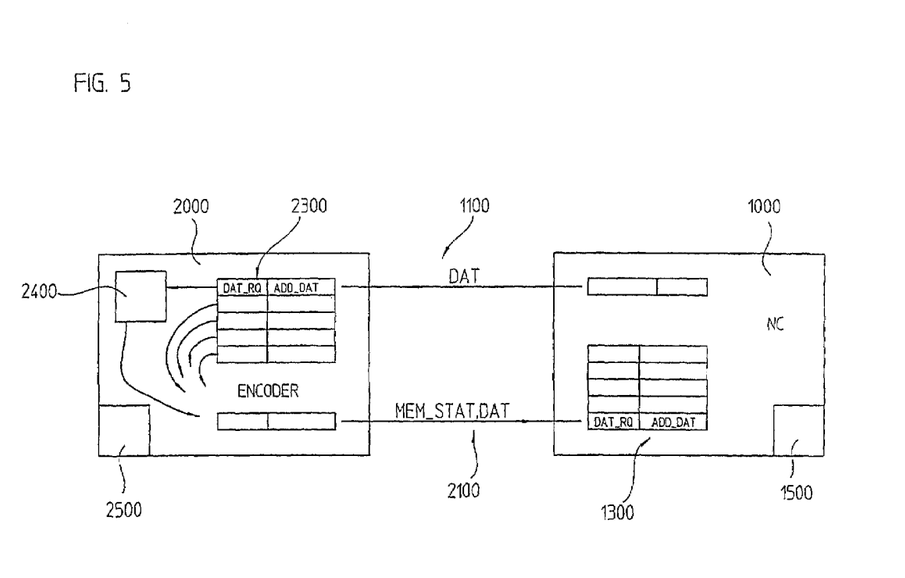
FIG. 5 is a greatly schematized block diagram of an embodiment of an embodiment of a device in accordance with the present invention.

In conclusion, some details regarding the device in accordance with the present invention, which are of importance in particular in connection with the transmission of non-time-critical data, will be explained, making reference to FIG. 5. Here, FIG. 5 shows in a largely schematic form a full duplex variation of the device in accordance with the invention with some components, yet to be explained in greater detail, which are of particular relevance for the present invention.

The device in accordance with the present invention also comprises a position measuring system (ENCODER) 2000, as well as a downstream connected processing unit (NC) 1000 which has, except for the components explained in what follows, a customary structure. The data transfer between the position measuring system 2000 and the processing unit 1000 takes place via two separate data channels 1100, 2100. Data from the position measuring system 2000 are transmitted to the processing unit 1000 via the first data channel 2100, and the data transmission in the opposite direction, i.e. from the processing unit 1000 to the position measuring system 2000, on the second data channel 1100.

Prior to the explanation of further details in connection with the transmission of the non-time-critical data DAT that follows, a schematically indicated control unit 2500 in the position measuring system 2000 is pointed out here. Its essential purpose is to synchronize, or to control, the data transfer in accordance with the present invention as explained above, as well as the internal processing of the various data in the position measuring system 2000. The control unit 2500 can be a processor, or also a suitable logical circuit.

Analogous to this, the processing unit 1000 also contains a corresponding control unit 1500 which, inter alia, controls the data transfer, or the data processing, as explained above. As a rule, the control unit 1500 in the processing unit 1000 is embodied as a processor.

Furthermore, a first memory unit 2300 is represented in the position measuring system 2000, which is used for storing the non-time-critical data DAT transmitted by the processing unit 1000 which, as explained above, includes the additional data ADD_DAT and the additional data commands DAT_RQ. Such a storage of the various received non-time-critical data DAT is necessary, since their processing, or handling, need not take place immediately as a rule. The additional data ADD_DAT and additional data commands DAT_RQ received in the course of transmission are therefore stored in the memory unit 2300 of the position measuring system 2000 and are processed as a function of their priority and the time required for processing. For example, these can be requests for system parameters of the position measuring system 2000, which are stored in a further memory module 2400 in the form of an EEPROM. The requested parameters are read out of the memory module 2400 that, in case of an EEPROM, takes place relatively slowly as a rule, and are subsequently transmitted to the processing unit 1000 in the previously explained manner. Parallel with this, the processing of further non-time-critical queries, or requests, can be performed by the position measuring system 2000, all of which are stored in the memory unit 2300. These can be, for example, queries regarding measured temperature values, measured acceleration values, etc.

Following the appropriate processing, the non-time-critical data DAT are transmitted, as described above, to the processing unit 1000, and are there also stored in a suitable second memory unit 1300. The processing of the data stored in the memory unit 1300 can then also take place in the processing unit depending on the urgency, or priority, of these data by respective processes, which have been provided in a suitable manner by software.

The memory units 2300, 1300 of the position measuring system 2000, or the processing unit 1000, are designed in a way that corresponds to the structure of the transmitted non-time-critical data DAT. This means that for every transmitted data set of non-time-critical data DAT a first memory area for the additional data ADD_DAT, as well as a second memory area for the additional data commands DAT_RQ, is provided. The size of the respective memory areas must of course be matched to the size of the respective data words of the non-time-critical data DAT.

It should be further mentioned in connection with the memory units 1300, 2300 that, within the scope of the data transmission in accordance with the present invention, besides the above explained data, also memory unit status data MEM_STAT are furthermore regularly transmitted between the position measuring system 2000 and the processing unit 1000. These relate to information regarding the respective memory units 1300, 2300. The memory unit status data MEM_STAT here at least comprise information regarding the actual memory status, i.e. whether the respective memory unit 1300, 2300 is full, empty or partially filled, etc. This is of particular importance in connection with the memory unit 2300 of the position measuring system 2000 since, if the memory unit 2300 is full, no further data DAT can be transmitted from the processing unit 1000 in the direction of the position measuring system 2000. It is therefore possible to assure by the regular transmission of the memory unit status data MEM_STAT, that the respective opposite side no longer transmits such data DAT if the respective memory unit 1300, 2300 is full.

The foregoing description is provided to illustrate the invention, and is not to be construed as a limitation. Numerous additions, substitutions and other changes can be made to the invention without departing from its scope as set forth in the appended claims.

We claim:

1. A method for serial data transmission between a position measuring system and a processing unit, comprising:
   transmitting position data and further data between said position measuring system and said processing unit in serial form as digital data words;
   transmitting up-to-date position data between said position measuring system and said processing unit upon transmission of a position request command;
   always transmitting further data, whose processing is not time-critical, immediately following said transmitting said up-to-date position data from said position measuring system to said processing unit;
   transmitting several different position request commands, which are assigned different processing priorities;
   transmitting a position request command for requesting said up-to-date position data;
   always transmitting immediately following said position request command, further data, whose processing is not time-critical;
   transmitting said up-to-date position data in accordance with said assigned different processing priorities;
   having a position request signal arrive in said processing unit during said transmission of non-time-critical data;
   interrupting said transmission of said non-time-critical data; and
   immediately transmitting a position data request command to said position measuring system in the place of said non-time-critical data, whereupon said up-to-date position data are immediately transmitted from said position measuring system to said processing unit.

2. The method in accordance with claim 1, wherein said further data is transmitted from said position measuring system to said processing unit.

3. The method in accordance with claim 1, wherein said further data is transmitted from said processing unit to said position measuring system.

4. The method in accordance with claim 1, further comprising transmitting said up-to-date position data and said position request command in the form of digital data words of a predetermined word length, or as data packets comprising digital data words.

5. The method in accordance with claim 4, wherein with said transmitting of either of said digital data words or data packets, a data word identification is transmitted, which unequivocally identifies a beginning and type of said respective associated digital data word or data packet.

6. The method in accordance with claim 1, further comprising transmitting additional non-time-critical data in the form of digital data words of a predetermined word length, or as data packets comprising digital data words.

7. The method in accordance with claim 6, wherein said additional non-time-critical data comprises additional data and additional data commands.

8. The method in accordance with claim 1, wherein said interrupting said transmission of said non-time-critical data is completed at a later time after said up-to-date position data has been completely transmitted by said position measuring system to said processing unit.

9. The method in accordance with claim 1, further comprising interrupting said transmission of said non-time-critical data when a position request command arrives in said position measuring system during said transmission of non-time-critical data; and
   transmitting said up-to-date position data to said position measuring system in place of said non-time-critical data.

10. The method in accordance with claim 1, wherein all data transmitted between said position measuring system and said processing unit are transmitted over a common data channel.

11. The method in accordance with claim 1, wherein data transmitted from said position measuring system to said processing unit are transmitted via a first data channel, and said data transmitted from said processing unit to said position measuring system are transmitted via a second data channel.

12. The method in accordance with claim 1, further comprising storing said non-time-critical data.

13. The method in accordance with claim 12, wherein said non-time-critical data is transmitted by said processing unit to said position measuring system and said storing comprises storing said transmitted non-time-critical data in a memory unit of said position measuring system.

14. The method in accordance with claim 13, further comprising storing non-time-critical data transmitted by said position measuring system in a second memory unit of said processing unit.

15. The method in accordance with claim 12, further comprising transmitting memory unit status data, which contain at least information regarding an actual memory status of a memory unit.

16. The method in accordance with claim 1, further comprising transmitting several different position request commands, which are assigned different processing priorities; and
   transmitting said up-to-date position data in accordance with said assigned different processing priorities.

17. The method in accordance with claim 16, wherein said different processing priorities comprise:
   a first position request command used for position control, which causes said transmission of said up-to-date position data to be at the highest priority; and
   a second position request command used for digitizing a workpiece contour, which causes said transmission of said up-to-date position data at a lower priority relative to said first position request command.

18. The method in accordance with claim 16, further comprising interrupting transmission of position data which had been requested by a position request command of a first level of processing priority upon transmission of a position request command of a level of processing priority higher than said first level.

19. The method in accordance with claim 1, wherein said different processing priorities comprise:

a first position request command used for position control, which causes said transmission of said up-to-date position data to be at the highest priority; and a second position request command used for digitizing a workpiece contour, which causes said transmission of said up-to-date position data at a lower priority relative to said first position request command.

20. The method in accordance with claim 1, further comprising interrupting transmission of position data which had been requested by a position request command of a first level of processing priority upon transmission of a position request command of a level of processing priority higher than said first level.

21. A method for serial data transmission between a position measuring system and a processing unit, comprising:

transmitting up-to-date position data from a position measuring system to a processing unit;

transmitting non-time critical data, subsequent to said transmitting up-to-date position data, from said position measuring system to said processing unit; and transmitting related non-time-critical data over several blocks, between which up-to date position data is transmitted.

22. The method in accordance with claim 21, wherein parameters of said position measuring system are transmitted via said non-time-critical data.

23. The method in accordance with claim 21, wherein measured temperature values are transmitted via said non-time-critical data.

24. The method in accordance with claim 21, wherein diagnostic data of said position measuring system are transmitted via said non-time-critical data.

25. The method in accordance with claim 21, wherein assignment information is transmitted with each of said non-time-critical data.

26. The method in accordance with claim 21, further comprising requesting, via said processing unit, transmission of said non-time-critical data from said position measuring system.

27. The method in accordance with claim 21, wherein said non-time-critical data are transmitted in the form of digital data words of a preset word length or as data packets having digital data words.

28. The method in accordance with claim 21, wherein the data transmitted from the position measuring system to the processing unit are transmitted via a first data channel and the data transmitted from the processing unit to the position measuring system are transmitted via a second data channel.

29. The method in accordance with claim 21, wherein said transmitting said up-to-date position data takes place between said non-time-critical data.

30. A system for serial data transmission comprising:

a position measuring system;

a processing unit in communication with said position measuring system; and means for transmitting up to date position data between said position measuring system and said processing unit and for transmitting non-time critical data subsequent to said transmitting said up to date position data, wherein transmission of related non-time-critical data takes place over several blocks, between which said up to date position data is transmitted.

31. The system in accordance with claim 30, further comprising;

a first data channel in communication with said position measuring system and said processing unit and transmitting data from said position measuring system to said processing unit; and a second data channel in communication with said position measuring system and said processing unit and transmitting data from said processing unit to said position measuring system.

32. The system in accordance with claim 30, wherein a transmission of parameters of said position measuring system takes place via said non-time-critical data.

33. The system in accordance with claim 30, wherein a transmission of measured temperature values takes place via said non-time-critical data.

34. The system in accordance with claim 30, wherein a transmission of diagnostic data of said position measuring system takes place via said non-time-critical data.

35. The system in accordance with claim 30, wherein a transmission of assignment information takes place with said non-time-critical data.

36. The system in accordance with claim 30, wherein a transmission of said non-time-critical data takes place in the form of digital data words of a preset word length or as data packets having digital data words.

37. The system in accordance with claim 30, wherein said non-time-critical data is chronologically distributed over said several blocks.

* * * * *